United States Patent
Hersh et al.

(10) Patent No.: US 7,111,293 B1
(45) Date of Patent: Sep. 19, 2006

(54) METHOD FOR INCREASED CONCURRENCY IN A COMPUTER SYSTEM

(75) Inventors: Clifford L. Hersh, Berkeley, CA (US); Herbert W. Sullivan, deceased, late of New York, NY (US); Joan Todd, legal representative, New York, NY (US); Dominic Gaeta, legal representative, Ridgewood, NJ (US)

(73) Assignee: ANTs Software, Inc., Burlingame, CA (US)

( * ) Notice: Subject to any disclaimer, the term of this patent is extended or adjusted under 35 U.S.C. 154(b) by 0 days.

(21) Appl. No.: 09/701,797

(22) PCT Filed: Jun. 3, 1999

(86) PCT No.: PCT/US99/12433

§ 371 (c)(1),
(2), (4) Date: Dec. 19, 2003

(87) PCT Pub. No.: WO99/63449

PCT Pub. Date: Dec. 9, 1999

Related U.S. Application Data

(60) Provisional application No. 60/087,891, filed on Jun. 3, 1998.

(51) Int. Cl.
*G06F 9/46* (2006.01)
(52) U.S. Cl. ...................... 718/100; 711/147
(58) Field of Classification Search ................ 718/100; 709/234; 711/147
See application file for complete search history.

(56) References Cited

U.S. PATENT DOCUMENTS

| 4,707,781 | A | | 11/1987 | Sullivan et al. |
| 4,901,230 | A | | 2/1990 | Chen et al. |
| 5,210,828 | A | | 5/1993 | Bolan et al. |
| 5,224,215 | A | * | 6/1993 | Disbrow ................ 709/234 |
| 5,438,680 | A | * | 8/1995 | Sullivan ................ 718/100 |
| 5,579,505 | A | | 11/1996 | Ohkami |
| 6,360,220 | B1 | | 3/2002 | Forin |
| 6,629,152 | B1 | | 9/2003 | Kingsbury et al. |

* cited by examiner

*Primary Examiner*—Meng-Al T. An
*Assistant Examiner*—Camquy Truong
(74) *Attorney, Agent, or Firm*—Carr & Ferrell LLP

(57) ABSTRACT

A method for enhancing concurrency in a multiprocessor computer system is described. Various tasks in a computer system communicate using commonly accessible mailboxes to access valid data from a location in the mailbox. A task holding the valid data places that data in a mailbox, and other tasks read the valid data from the mailbox. The task that inputs the valid data into the mailbox is caused to notify other tasks addressing the mailbox that the valid data is contained therein. Thus, no central coordination of mailbox access is required. Further, busy waits for valid data are minimized and the ressources of tasks and processors are used more efficiently. By coordinating several lists associated with each mailbox, conflicts in accessing data and delays in obtaining data are also minimized.

12 Claims, 9 Drawing Sheets

METHOD FOR INCREASED CONCURRENCY IN A COMPUTER SYSTEM

This application claims the benefit of Provisional Application No. 60/087,891, filed Jun. 3, 1998.

BACKGROUND OF THE INVENTION

The present invention relates generally to multitasking computer systems, and more particularly, to multiprocessor systems and a method for increased concurrency in such systems.

Multiprocessor computing systems have been used for years to perform multiple tasks. A multiprocessing computing system may be defined as a computer assembled from a plurality of independently or semi-independently operating intelligent, i.e., processor-based, stations. The stations are generally interconnected for communication by a communication bus. Each processor may perform a plurality of tasks with apparent concurrency. Distributing the system intelligence among a plurality of stations may improve the processing throughput of the computing system, allow the system to modularly and uniformly expand to meet increasing computing requirements, and permit greater efficiency and productivity through concurrency.

While multiprocessor computing systems are known, they are not scalable. The software of such systems is often highly dependent upon the configuration and characteristics of the system hardware. This means that the scalability of the multiprocessor is limited. Further, the dependency of the software on the hardware often causes a waste in processor resources.

Synchronizing or coordinating the tasks using a central processor to enhance concurrency of a plurality of tasks has been problematic in most multiprocessor systems. The prior patents of Sullivan, U.S. Pat. Nos. 4,484,262, 4,707,781 and 5,438,680, the disclosures of which are incorporated herein by reference, addressed some issues relating to enhancing concurrency.

The Sullivan patents describe that concurrency can be enhanced by communicating between processors or tasks via commonly accessible memory to reduce conflicts within the multiprocessor system. However, the disclosed techniques are primarily dependent on hardware, such as the processors.

Therefore, a need exists for a software-based system that is capable of enhancing the concurrency of any multiprocessor computing system.

SUMMARY OF THE INVENTION

In one aspect, the invention is directed to a method for operating a computer system. The computer includes at least one processor. The method includes establishing a plurality of memory units each having a corresponding memory location. A plurality of tasks running on the processor are executed, and the plurality of tasks are operable to share data. A plurality of lists for each memory location are defined, and at least one of said lists is locked if the data is invalid. An entry is inserted into said locked list corresponding to one of said tasks. The locked list is unlocked, and a determination is made if data is inputted in the memory location between the determining step and the unlocking step.

In another aspect, the invention is directed to a method for operating a computer system. The system includes at least one processor. The method includes establishing a plurality of memory units each having a corresponding memory location. A plurality of tasks are run on said processor, and the plurality of tasks are operable to share data. An entry corresponding to one of the tasks is inserted into one of the lists if the list is unlocked. The method also includes determining if another of said lists is unlocked if said one list is locked.

In another aspect, the invention is directed to a method for synchronizing processes in a computer system. The computer system includes at least one processor. The method includes establishing a plurality of memory units each having a corresponding memory location. A plurality of tasks running on the processor are executed, and the plurality of tasks are operable to share data located in the memory units. A plurality of lists for each memory location are defined. A list is locked if the data is not valid. An entry is inserted into the locked list corresponding to one of the tasks, and the list is unlocked. The entered task is suspended until valid data is found in the memory unit. The method also includes the steps of reading valid data and determining if other data appears in said memory location before said locking step and after said unlocking step. The other data is read if it appears in the memory unit.

Implementations of the invention include one or more of the following. The locking step further comprises activating selected other ones of said plurality of tasks that are entered on said locked lists. The plurality of lists may form a linked list. The plurality of lists may be between four and eight. The method may also include the step of transferring the operation of said locked list when said locked list is locked by another one of said plurality of tasks.

In another aspect, the invention is directed to a computer system having enhanced concurrency that includes a plurality of processors. A plurality of tasks are run on the plurality of processors. The computer system may also include a plurality of memory units each having a corresponding memory location, and a plurality of lists corresponding to each of said memory locations. One of said tasks may be responsible for activating selected ones of said plurality of tasks contained on the same list as said one task.

DETAILED DESCRIPTION OF THE PREFERRED EMBODIMENTS

Figure 1A:
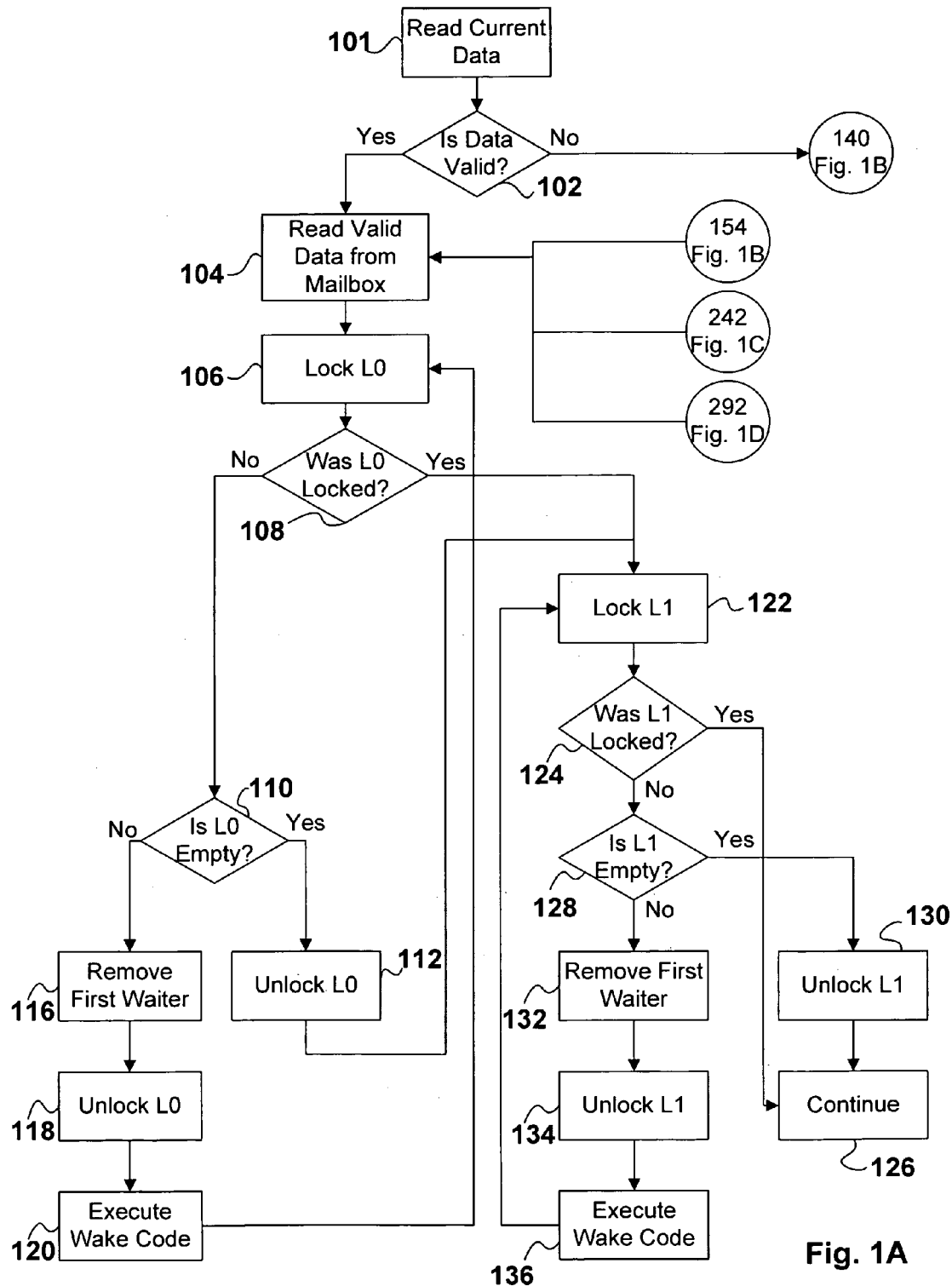
FIGS. 1A–1D are flowcharts illustrating a preferred method of reading data from a mailbox.
Figure 1B:
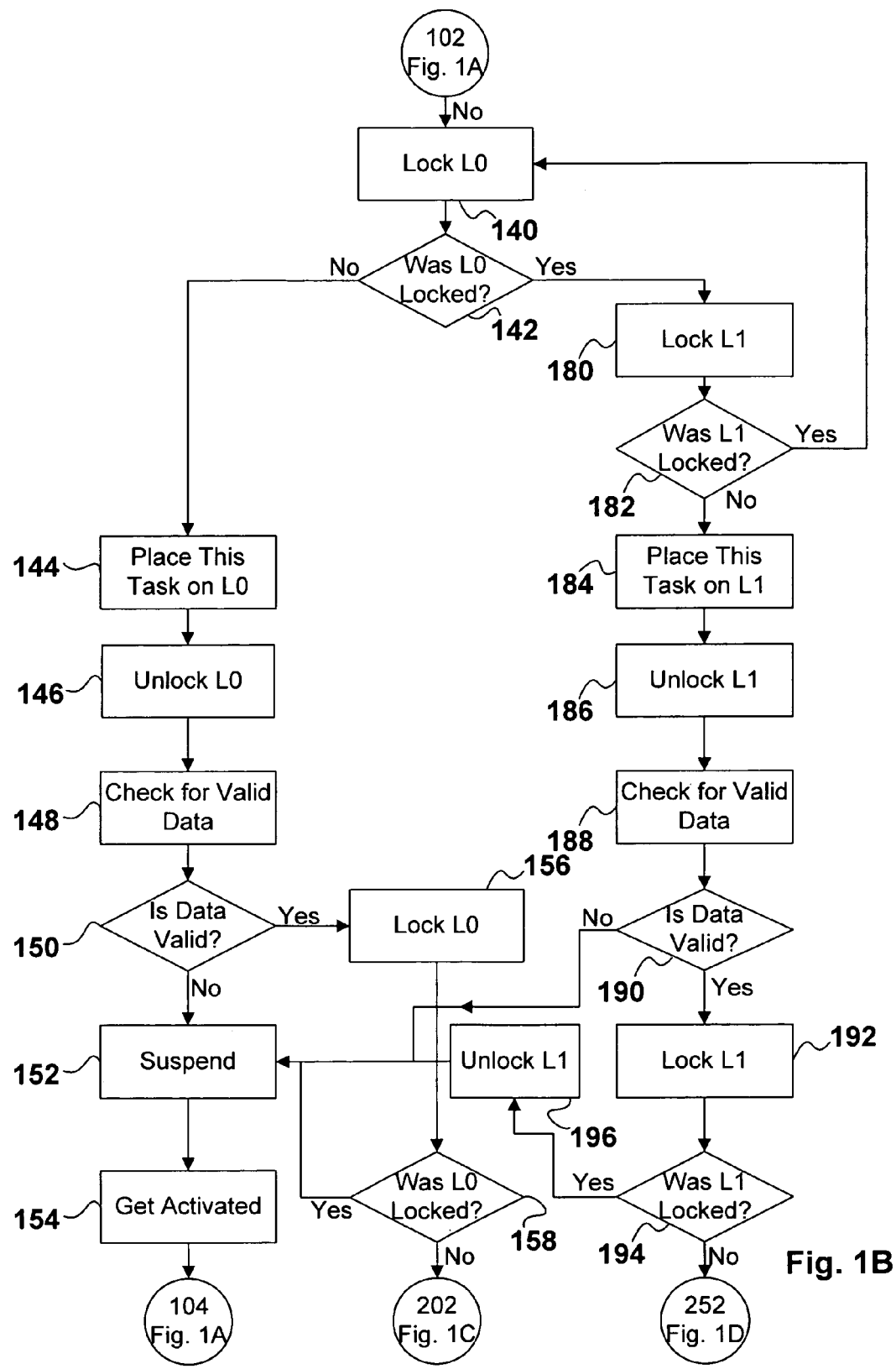
Figure 1C:
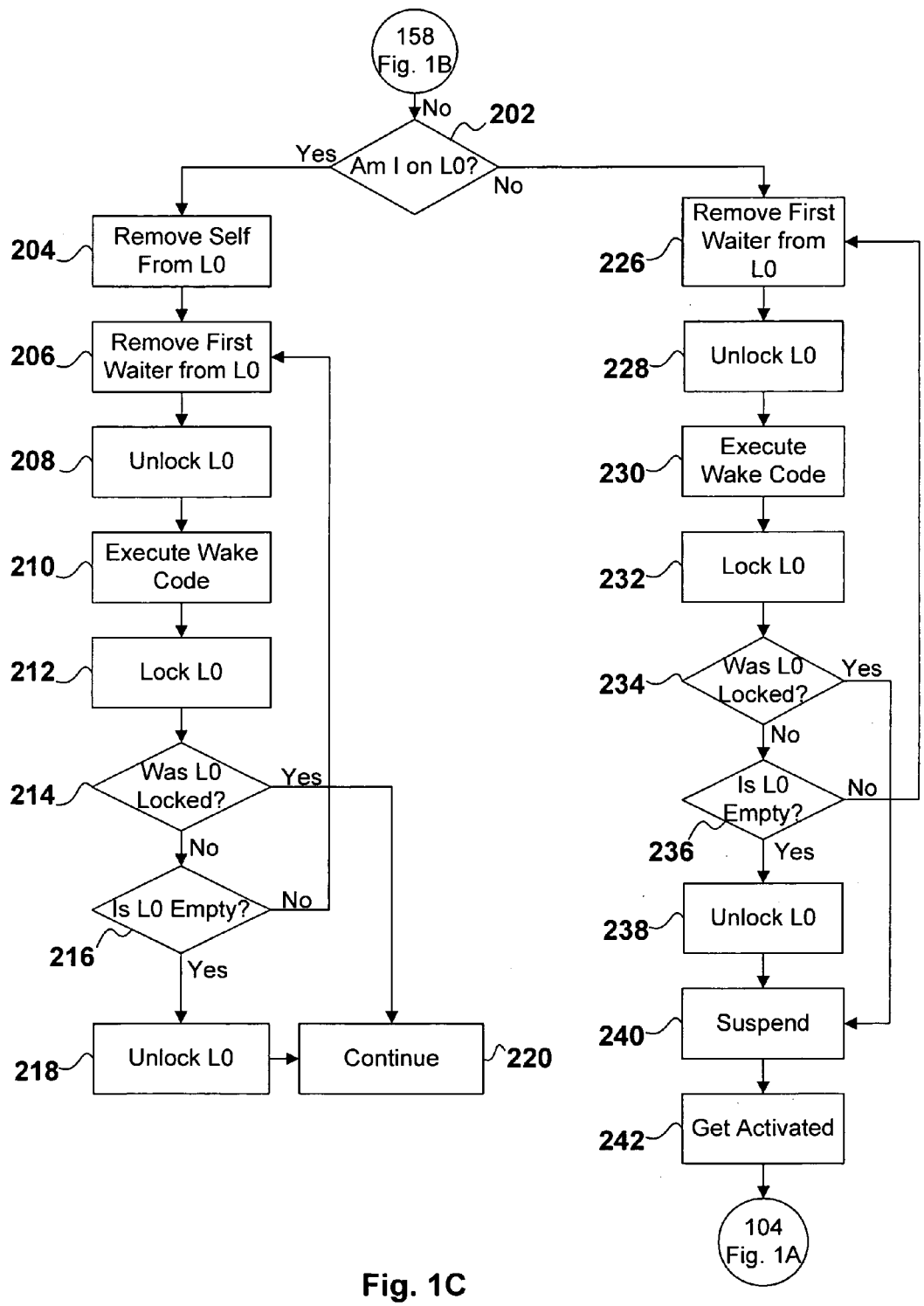

The present invention is directed to a system and method for enhancing concurrency in a multiprocessor or multitasking computer system. A multitasking computer system may be defined as a computer system that permits multiple threads of execution in a single execution space. A multiprocessing computer system may be defined as a computer system that allows multiple processing units to share data. Preferably, various tasks in the computer system communicate using commonly accessible "mailboxes." A mailbox is an area of memory that contains a number of states, and may be identified by a virtual address. When one task produces an item of valid data that may be desired by multiple other tasks, the task holding the valid data inputs it into a mailbox. Generally, other tasks read the valid data from the mailbox.

In accordance with a preferred method, the task that inputs the valid data into the mailbox is caused to notify other tasks addressing the mailbox that the data is contained therein. This means that there is no need for central coordination of mailbox accesses. Further, this minimizes busy waits for valid data. This, permits tasks and processors to allocate their resources more productively.

As stated above, the mailbox is a memory location. The mailbox includes a pointer to the address corresponding to valid data. Alternatively, a number, such as a string of zeros, is employed if the data is invalid. For simplicity, the preferred method will be described with reference to inputting or reading data to or from the mailbox. However, the data to be accessed can be located in the same memory system as the mailbox. Further, the term "task" refers to a set of instructions running on a processor. Thus, the processor executes the task. Additionally, the terms "invalid" and "valid" refer to arbitrary logical status. In the preferred method, a task reads valid data and does not read invalid data. Other states may be used such as "true" and "false".

A plurality of lists of tasks wait for valid data associated with the mailbox. By coordinating several lists in accordance with the preferred method, conflicts in accessing data and delays in obtaining data can be minimized. This is because only a small number of instructions, for example, under 30, are required to read or place data to or from the mailbox. These functions occupy a small percentage of a task's activity time, such as 5% or less. Accordingly, it has been found that a smaller number of lists can eliminate most conflicts. However, a list for each active task may be required to eliminate all conflicts. Any number of lists may be used. For example, the number of lists may be between four and eight.

In the preferred method, the lists are a linked list. A linked list can employ locations in the same memory system as the mailboxes. The linked list includes locations having suitable space for at least two pointers. The locations in the middle of the list may contain a forward pointer to the next location including the list, and a backward pointer to the preceding location including the list. Additionally, the top location on the list may contain a pointer forward to the next location and a pointer backward to an illegal address, such as zero. The bottom location on the list can contain a pointer backward to the preceding location and a forward pointer to an illegal address, such as zero. When an item, i.e., data, is added to the list, the forward pointer corresponding to the previous bottom location is changed to correspond to the location of the added item. Also, the added item becomes the new bottom location. When the top item is taken from the list, the next item in the list replaces the top item. Additionally, the backward pointer of the added item is changed to point to an illegal address, such as zero. When both pointers of an item in a mailbox are to an invalid address, the list is considered empty.

Reading Valid Data when Available

FIGS. 1A–1D are flow charts showing a preferred method for reading data from a mailbox. Initially, data in a mailbox is read (step 101). In the preferred method, the mailbox may contain a pointer to the memory location containing the desired valid data or an illegal address corresponding to invalid data, such as zero. The mailbox is then addressed and interrogated to determine if the data is valid (step 102). At this stage, a mailbox may contain or is about to contain data associated with a program of a task seeking such data. If valid data is in the mailbox, it is read from the memory address indicated in the mailbox (step 104). The task may also read the data during step 102.

One aspect described herein is that the task performing steps 101 and 102 contacts other tasks waiting for valid data from that mailbox. This means that conflicts are avoided in the multiprocessor system because busy waits for valid data are minimized.

FIGS. 1A–1D illustrate lists L0 and L1 that represent tasks waiting to receive valid data from a mailbox, and FIGS. 2A–2D shows lists L2 and L3 that identify tasks waiting to input valid data in the mailbox.

As shown in FIG. 1A, a task list is locked when it is manipulated by a task. This prevents access by other tasks to that list. After list L0 is locked (step 106), the task determines if list L0 was previously locked by another task (step 108). If list L0 was previously locked by another task prior to the current task executing steps 106 or 108, the prior task operates list L0. The current task then proceeds to check list L1 (step 122), as described below.

If list L0 was not previously locked (step 108), the current task determines if list L0 is empty (step 110). If the list L0 is not empty, the current task then removes the first waiting task ("waiter") from the list (step 116). A waiter may be defined as a task that waits for valid data to be in a mailbox. In this configuration, a waiter may be in a suspended state, as described below. The current task then unlocks list L0 such that other tasks may access the list (step 118). Additionally, the current task causes the task associated with that waiter to execute a wake code (step 120). A wake code may be defined as a set of computer instructions that cause a task to activate from a suspended mode. Then, the current task again locks list L0 (step 106). This process continues until each task on list L0 has been notified, and the list L0 is empty. Alternatively, this process may continue until the list L0 has been found locked. If this list is empty, list L0 is unlocked (step 112), and the task proceeds to check list L1 (step 122), as described below.

If list L0 was previously locked (step 108), the current task locks list L1 (step 122), and then checks if that list was previously locked (step 124). If list L1 was not previously locked at step 126, the current task determines if list L1 is empty (step 128). If list L1 is not empty, the current task removes the waiters from list L1 (step 132) and causes the waiters to execute their wake codes (step 134), as described above. This process repeats until list L1 is empty or the list L1 has been found locked. When list L1 is empty, it is unlocked (step 130). The task then continues to execute its remaining instructions as defined by the system (step 126). If list L1 was previously locked by another task prior to steps 122, 124 or 126, that task operates the locked list. The current task then executes step 126.

Valid Data not Available

If no valid data is found at the mailbox (step 102), list L0 is locked (step 140). The current task then determines if list L0 was previously locked (step 142). If the list was not previously locked, the current task is entered on list L0 (step 144). List L0 is then unlocked (step 146), and the current task checks for valid data (step 148). The current tasks then determines the validity of the data (step 150). This above process may be referred to as "one last look." as described below. In the preferred method, this configuration keeps two or more tasks, which are synchronized by passing data through the mailbox, from missing each other.

If the data is still not valid at step 150, the task is suspended (step 152). This releases computer system resources for other tasks, or the task can complete other system instructions. This means that the task does not busy wait or periodically check for valid data in the memory location. The current task will be activated by another task which has found valid data in the memory location, or by a task which previously inputted the valid data (step 154). When activated by another task, the current task proceeds to read the valid data from the mailbox (step 104). If the data is valid (step 150) and list L0 was previously locked (steps 156 and 158), the current task is suspended until activated (steps 152 and 154). When activated by another task, the current task proceeds to read the valid data from the mailbox (step 104).

If the data was valid (step 150) and the current task determines that list L0 was not locked (step 156 and 158), the current task reads the data. This may occur as the current task determines the validity of the data. Then, the current task executes step 202.

If the current task is on the list L0 at step 202, the current task is removed from the list (step 204). The next waiting task is also removed from the list L0 (step 206), and list L0 is again unlocked (step 208). The task then causes the other task removed from the list to execute its wake code (step 210).

Next, in accordance with the preferred method, the current task determines if the list L0 was previously locked (steps 212 and 214). If so, the current task then executes other system instructions (step 220). If the list was not previously locked, the current task then determines if the list is empty (step 216).

If list L0 is not empty (step 216), the current task loops back to remove and notify the next task at the top of the list (steps 206–216). If on any such loop, the list is found locked at steps 214 or 216, the current task continues to perform other system instructions (steps 220). When the list is empty, it is unlocked (step 218) and the current task continues to perform other system instructions (step 220).

The current task may not be on the list L0 (step 202). This means that another task has removed the current task from the list and is operating to activate it. However, the current task also operates list L0. Thus, the current task must activate the other tasks on list L0. The current task may then suspend itself until activated by another task.

Steps 228 through 238 operate similar to steps 206 through 218. However, when list L0 is found locked (step 234) or empty (step 236), the current task is suspended (step 240). When activated by another task (step 242), the current task proceeds to read the valid data from the mailbox (step 104).

Referring again to FIG. 1B, if list L0 was locked (step 142), the current task proceeds as follows. List L1 is locked and then the current task determines whether that list was previously locked (steps 180 and 182). If list L1 was previously locked, the current task returns to lock list L0 (step 140), and continues to search for an unlocked list. This example provides two possible lists. However, more lists may be used. If the number of lists equals the number of tasks, no task will repeat this loop.

If list L1 was not previously locked (step 182), the current task becomes a waiter on list L1 (step 184), the list L1 is unlocked (step 186), and a "one last look" check is made for valid data (steps 188 and 190). If the data is not valid, the current task is suspended (step 152).

If the data is valid (step 190), then the current task reads the data as it confirms the validity of the data. List L1 is then locked (step 192), and a check is made whether it was previously locked (step 194). If list L1 was previously locked (step 194), list L1 is unlocked (step 196), and the current task is suspended (step 152).

If the data was valid and it is determined that list L1 was not locked, at steps 190, 194, and 196, respectively, then the current task proceeds (step 252).

Figure 1D:
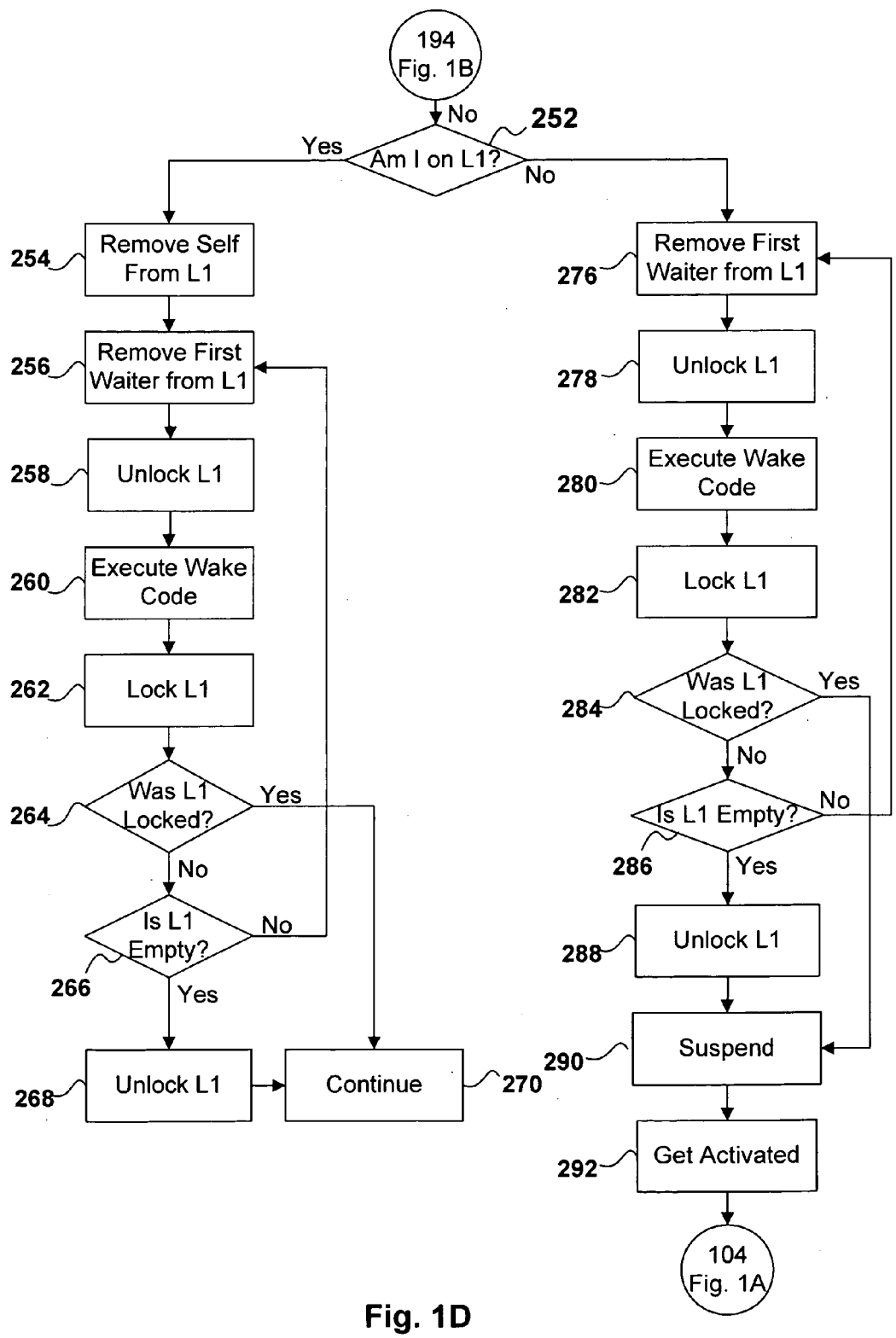
Figure 2A:
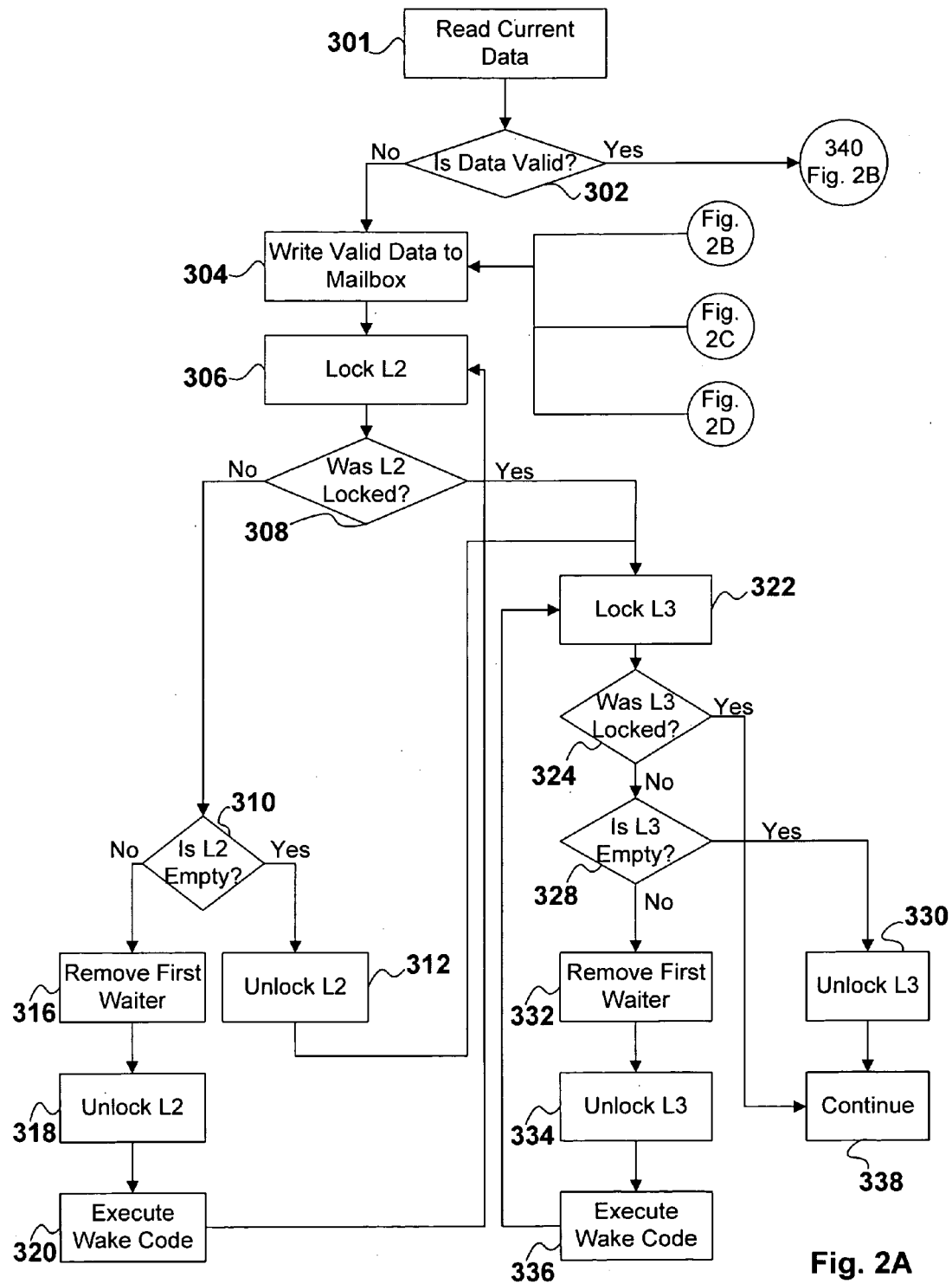
FIGS. 2A–2D are flowcharts illustrating a preferred method of inputting data in a mailbox.
Figure 2B:
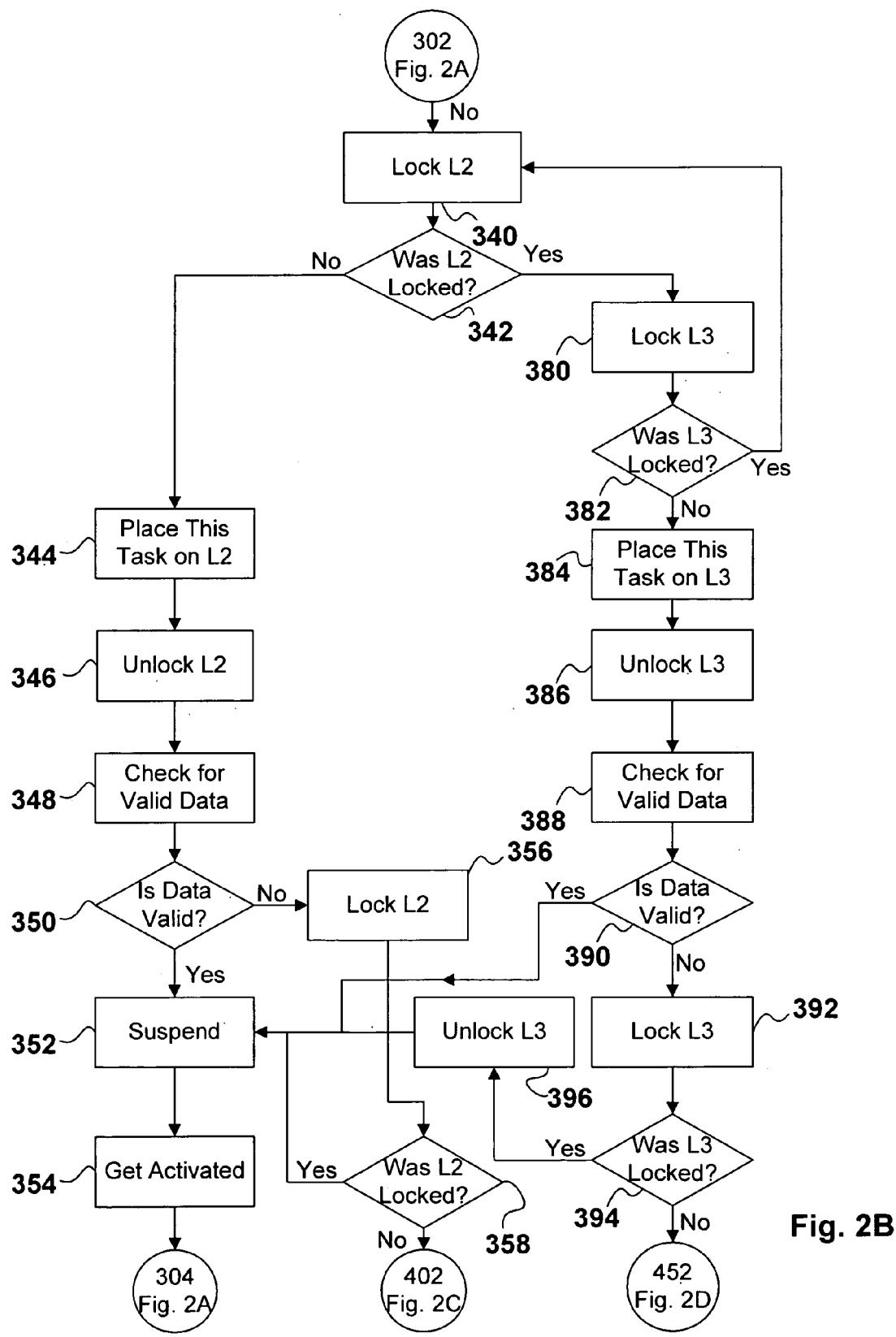
Figure 2C:
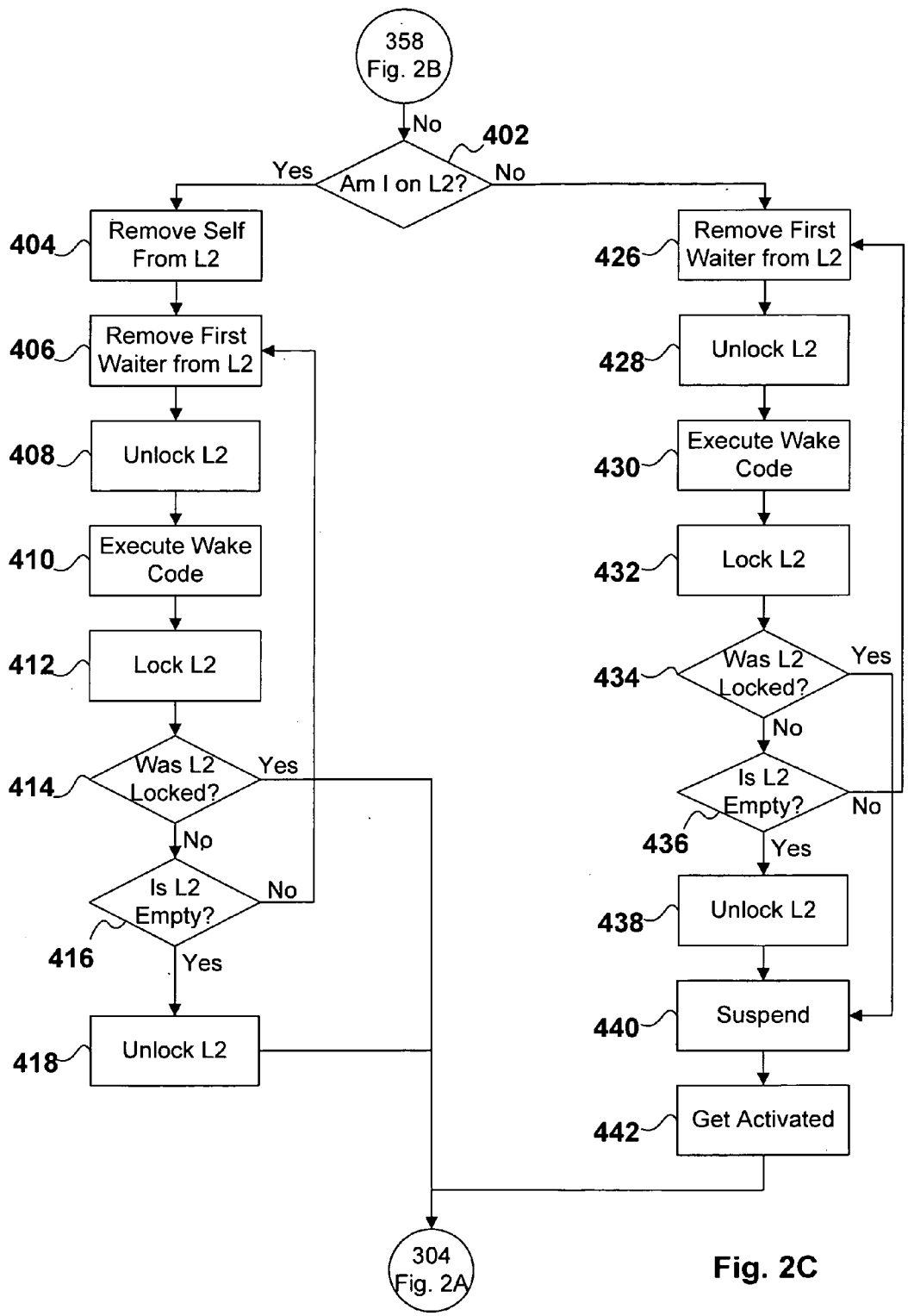
Figure 2D:
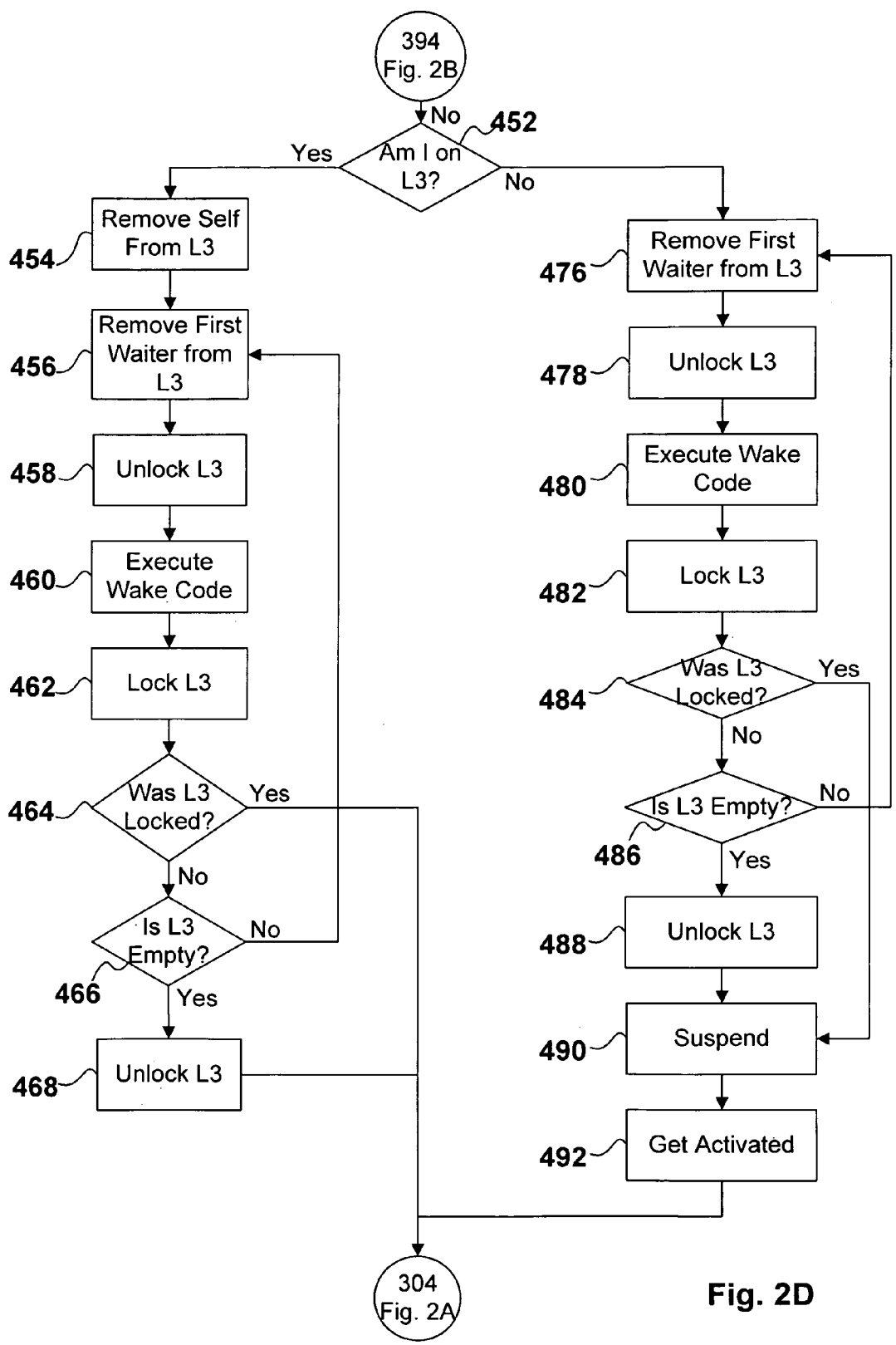

FIG. 1D shows that if the current task is on list L1 (step 252) that task is removed from the list (step 254), and also removes the next waiting task from the list L1 (step 256). The task then unlocks list L1 again (step 258). The task then causes the other task removed from the list to execute its wake code (step 260).

Next, the current task determines whether the list L1 was previously locked (steps 262 and 264). If it was not previously locked, the current task determines whether the list is empty (step 266).

If list L1 is not empty (step 266), the current task loops back to activates task at the top of the list (steps 256 through 266). If on any such loop, the list is found locked at steps 264 or 266, the current task continues step (270). When the list is empty, it is unlocked (step 261), and the current task continues to execute other system instructions (step 270).

If the current task is not found on the list L1 (step 252), this means that some other task has taken the current task off the list and is attempting to activate it. The current task also operates list L1. Thus, this task must activate the other tasks on list L1 before suspending itself. The current task can then be activated by another task. The method of steps 278 through 288 is similar to steps 256 through 268 described above. However, when list L1 is found locked (step 284) or empty (step 286), the current task is suspended (step 290). When activated by another task (step 292), the current task proceeds to read the valid data from the mailbox at step 104.

This preferred method of finding an available list is simple. Further, a task should not be significantly delayed in finding an unlocked list. Thus, enhanced concurrency can be achieved over prior systems.

Inputting Valid Data

FIGS. 2A–2D are flow charts showing the input of data into a mailbox in accordance with the preferred method. Initially, data is read in a mailbox (step 301). The mailbox is then addressed and interrogated to determine whether the data is valid (step 302). If valid data is not already in that mailbox, the mailbox is marked as not containing valid data. Next, the valid data is placed in the mailbox (step 304).

In accordance with the preferred method, lists L2 and L3 identify tasks waiting to input valid data in the mailbox. This includes a current task waiting to input data in the mailbox. The current task determines whether list L2 was previously locked (step 304). If so, that list remains locked (step 306). If list L2 was not previously locked, the current task determines whether list L2 is empty (step 310). If the list L2 is not empty, then the current task removes the first waiter from that list (step 316). Also, the current task unlocks list L2 so that other tasks may access it (step 318), and causes the task associated with that waiter to execute its wake code (step 320). Then, the current task locks list L2 again (step 306). The above process continues from step 306 until all tasks on list L2 seeking the valid data from the mailbox have been activated. Alternatively, this process continues until the list L2 is empty, or the list L2 has been found locked. When list L2 is found empty, it is unlocked (step 312), and the current task proceeds to list L3 (step 322).

If list L2 was previously locked (step 301) or list L2 was found empty (step 310) and then unlocked (step 312), the current task then locks list L3 (step 322). Then, the current task checks if list L3 was previously locked (step 324). If list L3 was not previously locked, the current task determines whether list L3 is empty (step 328). If list L3 is not empty, the current task proceeds to remove the waiters from list L3 (steps 332 and 334) and causes them to execute their wake codes (step 306). This process repeats by looping back to step 322. The process may continue until list L3 is empty or has been found locked. When list L3 is empty, it is unlocked and the current task continues to execute other system instructions (steps 330 and 338). If list L3 is found to have been previously locked at steps 322 or 324, this indicates activity by another task. The current task then executes other system activities (step 338). The current task also defers to the other task to activate the other tasks listed on list L3.

Valid Data Found in Mailbox

If the current task determines that there is valid data at the memory location (step 302), the list L2 is locked (step 340). The current task also checks whether the list was previously locked (step 342). If list L2 was not previously locked, the current task is inserted onto list L2 (step 344). List L2 is then unlocked (step 346) and a "one last look" check is made for valid data (steps 348 and 350), as described below. If the data is still invalid, the current task is suspended (step 352). The current task is then activated by another task that has found or inputted valid data in the memory location (step 354).

If the data in the mailbox is valid and list L2 was previously locked (steps 356 and 358), the current task is suspended until activated (steps 352 and 354). When activated by another task, the current task proceeds to input valid data into the mailbox (step 304).

If the data was not valid (step 350) and list L2 was not previously locked (steps 356 and 358), the current task continues to execute other system commands (step 402).

If the current task is on list L2 (step 402) the current task removes itself from that list (step 404). Also, the current task removes the next waiting task from the list L2 (step 406) and unlocks list L2 again (step 408). The current task then causes the other task to be removed from the list to execute its wake code (step 410).

In accordance with the preferred method, the current task determines whether the list L2 was previously locked (steps 412 and 414). If so, the current task proceeds to input valid data in the mailbox (step 304). Otherwise, the current task determines whether the list is empty (step 416).

If list L2 is not empty (step 416), the current task loops back to remove and activate the next task at the top of the list (steps 406–416). If on any such loop, the list is locked at steps 414 or 416, the current task inputs valid data in the mailbox (step 304). When the list is empty, it is unlocked (step 418). The current task then inputs valid data in the mailbox (step 304).

If the task is not on the list L2 (step 402), the current task may be removed from the list and is being activated by another task. The current task also operates list L2. Thus, the current task must activate the other tasks which are on list L2 before suspending itself. The current task may then be activated by another task. The method of steps 428 through 438 is similar to steps 406–418. However, when list L2 is found previously locked (step 434) or empty (step 436), the current task is suspended (step 440). When activated by another task (step 442), the current task proceeds to input valid data in the mailbox (step 304).

If list L2 was previously locked at step 342, the current task locks list L3 (step 380) and then determines whether that list was previously locked (step 382). If list L3 was previously locked, the current task loops back to attempt to access list L2 (step 340), and continues to find an unlocked list. This example provides two possible lists. However, more than two lists may be employed.

If list L3 was not previously locked (step 382), the current task is inserted on list L3 as a waiter (step 384). The list L3 is also unlocked (step 386), and a "one last look" check is made for valid data (steps 388 and 390), as described below. If the data is valid, the current task is suspended (step 352).

If the data is not valid (step 390), list L3 is locked, (step 392) and a check is made whether list L3 was previously locked (step 394). If list L3 was previously locked, list L3 is unlocked (step 396), and the current task is suspended (step 352).

If the data was not valid and the list L3 was not previously locked (steps 390, 394, and 396), the current task proceeds to step 452.

If the current task is on list L3 (step 452), it is removed from that list (step 454). Also, the next waiting task from the list L3 is removed (step 456), and the current task unlocks list L3 again (step 458). The current task then causes the other task removed from the list to execute its wake code (step 460).

The current task then determines whether the list L3 was previously locked (steps 462 and 464). If it was not previously locked, the current task determines whether the list is empty (step 466).

If list L3 is not empty, the current task loops back to remove and activate the next task at the top of the list (steps 456–466). If on any such loop, the list is locked (steps 464 and 466), the current task inputs valid data in the mailbox (steps 304). When the list is empty, it is unlocked (step 468), and the current task determines if valid data is inputted in the mailbox (step 304).

If the current task does not find itself on list L3 (step 452), this may be because some other task has taken the task off the list and is trying to activate it. The current task, however, operates list L3. Thus, the current task must activate other tasks on list L3 before suspending itself. The current task then may be activated by another task. The method of steps 478 through 488 is similar to steps 456 through 468. However, when list L3 is found previously locked (step 484) or empty (step 486), the current task is suspended (step 490). When activated by another task (step 492), the current task proceeds to input valid data in the mailbox (step 304).

One Last Look

The term "one last look" refers to the situation where a task that has placed itself on a list for valid data from a mailbox receives that data. The preferred method allows tasks addressing the same mailbox to be coordinated. This means that a current task inputting valid data in a mailbox will activate another task that was entered onto a wait list, while the data was placed in the mailbox by the current task. Accordingly, a current task may not input valid data in the mailbox, while another task is inserted on a list to receive that data. The preferred method avoids the potentially infinite period of time that a task may sleep until another task activates it. Thus, delays in system processing time may be minimized.

Figure 3:
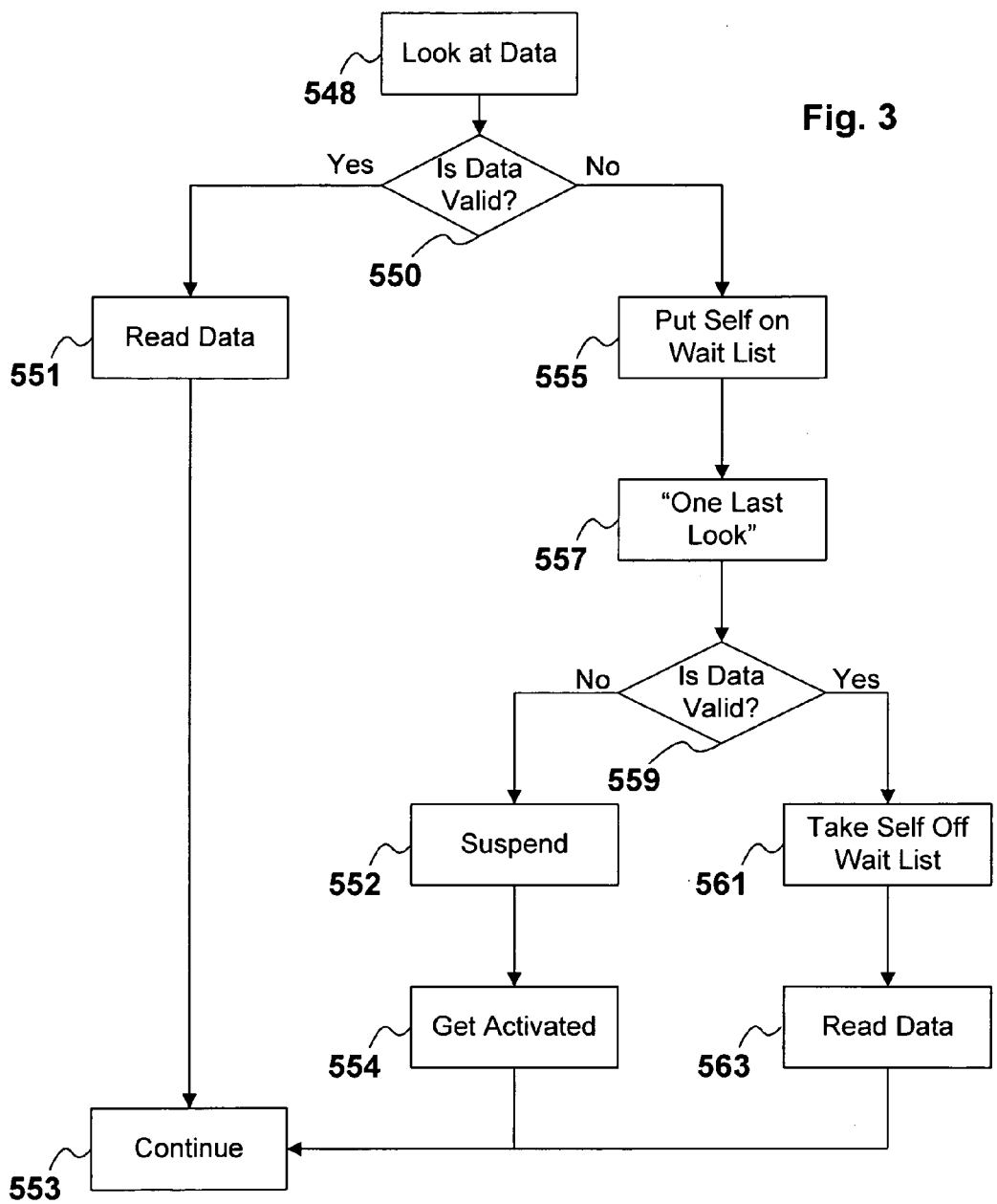
FIG. 3 is a flowchart of a "one last look" method.

FIG. 3 shows that a task first looks at the data in the selected mailbox and determines whether it is valid data (steps 548 and 550). If the data is valid, it reads the data and continues with other system activities (steps 551 and 553).

At this stage, if the data is not valid, the task is inserted onto a wait list (step 555). Then, the "one last look" determines if the data is valid (steps 557 and 559). This occurs because, while the task that may have located an unlocked list, locked it, placed itself on the list and unlocked the list again, another task may have put valid data in the mailbox. Without this preferred "one last look" method, activating the inserted task may be delayed until another task seeks valid data from the mailbox.

If the data is not valid at that time, the task will suspend until activated by another task, such as the next task inputting valid data in the mailbox (steps 552 and 554). This method corresponds generally to steps 352 and 354.

If the data is valid at that time (step 559), the task can take itself off the list (step 561). Alternatively, the task may read the data and continue its other system activities. This means that the task may assume that the data was initially found in the mailbox (steps 563 and 553). A number of embodiments of the present invention have been described. Nevertheless, it will be understood that various modifications may be made without departing from the spirit and scope of the invention. For example, the number of lists may be increased to accommodate additional tasks. Accordingly, it is to be understood that the invention is not to be limited by the specific illustrated embodiments, but only by the scope of the appended claims.

What is claimed is:

1. A method for operating a computer system, said computer system including at least one processor, comprising:
   establishing a plurality of memory units each having a corresponding memory location;
   executing a plurality of tasks running on said at least one processor, said plurality of tasks being operable to share data;
   defining a plurality of lists for each memory location;
   determining the validity of said data in one memory unit of said plurality of memory units;
   locking at least one of said plurality of lists if said data is invalid;
   inserting an entry corresponding to one of said plurality of tasks onto said locked list;
   unlocking said locked list; and
   determining if data is inputted in said corresponding memory location of said one memory unit between said determining step and said unlocking step.

2. A method for operating a computer system, said computer system comprising at least one processor, comprising:
   establishing a plurality of memory units each having a corresponding memory location;
   running a plurality of tasks on said processor, said plurality of tasks being operable to share data;
   defining a plurality of lists for each memory location;
   inserting an entry corresponding to one of said plurality of tasks onto one of said plurality of lists if said one list is unlocked; and
   determining if another of said lists is unlocked if said one list is locked.

3. A method for synchronizing processes in a computer system, said computer system including at least one processor, comprising:
   establishing a plurality of memory units each having a corresponding memory location;
   executing a plurality of tasks running on said processor, said plurality of tasks being operable to share data located in said memory units;
   defining a plurality of lists for each memory location;
   locking at least one of said plurality of lists if said data is not valid in one of said plurality of memory units;
   inserting an entry corresponding to one of said plurality of tasks onto said locked list;
   unlocking said locked list;
   suspending said one of said plurality of tasks until valid data is found in said member of said memory units;
   reading said valid data;
   determining if other data is inputted in said one of said memory units after said locking step and before said unlocking step; and
   reading said other data if said other data appears in said memory unit.

4. The method of claim 3, wherein the locking step further comprises activating selected other ones of said plurality of tasks that are entered on said locked list.

5. The method of claim 3, wherein said plurality of lists includes a linked list.

6. The method of claim 3, wherein said plurality of lists is between four and eight.

7. The method of claim 3, further comprising transferring the operation of said locked list when said locked list is locked by another one of said plurality of tasks.

8. A computer system having enhanced concurrency, comprising:
   a plurality of processors;
   a plurality of tasks running on said plurality of processors;
   a plurality of memory units each having a corresponding memory location;
   a plurality of lists corresponding to each of said memory location;
   wherein one of said plurality of tasks is responsible for activating selected ones of said plurality of tasks contained on the same list as said one task.

9. The system of claim 8, wherein said plurality of lists form a linked list.

10. The system of claim 8, wherein said plurality of lists is between four and eight.

11. The system of claim 8, wherein said computer system is a multitasking or multiprocessing computer system.

12. A method of operating a computer system having at least one processor, comprising:
    determining the validity of data in a memory unit;
    locking a list corresponding to said memory unit if said data is invalid;
    inserting an entry corresponding to one of a plurality of tasks onto said locked list;
    unlocking said locked list; and
    determining if data is inputted in a memory location within said memory unit between said determining step and said unlocking step.

* * * * *